United States Patent [19]
Winstead

[11] Patent Number: 5,718,165
[45] Date of Patent: Feb. 17, 1998

[54] BARBECUE AND COOKING APPARATUS

[76] Inventor: Ollie Winstead, P.O. Box 2223, Wilmington, N.C. 28402

[21] Appl. No.: 691,194

[22] Filed: Aug. 5, 1996

[51] Int. Cl.$^6$ ............................. A47J 27/00; A47J 37/00
[52] U.S. Cl. ................. 99/400; 99/401; 99/446; 99/447; 99/482
[58] Field of Search ............... 99/400, 401, 446, 99/447, 482

[56] References Cited

U.S. PATENT DOCUMENTS

| | | | |
|---|---|---|---|
| 3,333,526 | 8/1967 | Kirkpatrick | 99/482 X |
| 3,776,127 | 12/1973 | Muse | 99/482 |
| 4,773,319 | 9/1988 | Holland | 99/447 X |
| 4,909,137 | 3/1990 | Brugnoli | 99/446 X |
| 5,584,235 | 12/1996 | DuBois et al. | 99/482 X |

FOREIGN PATENT DOCUMENTS 8018  2/1900  Norway ................................ 99/482

*Primary Examiner*—Reginald L. Alexander
*Attorney, Agent, or Firm*—Clifton Ted Hunt

[57] ABSTRACT

The present invention is a grill intended for use in outdoor cooking. A burner assembly and a grid are enclosed in a housing that is arranged for even distribution of heat through the grid, and the grill is selectively usable to barbecue meat with or without wood flavoring or to steam meat and other food.

7 Claims, 4 Drawing Sheets

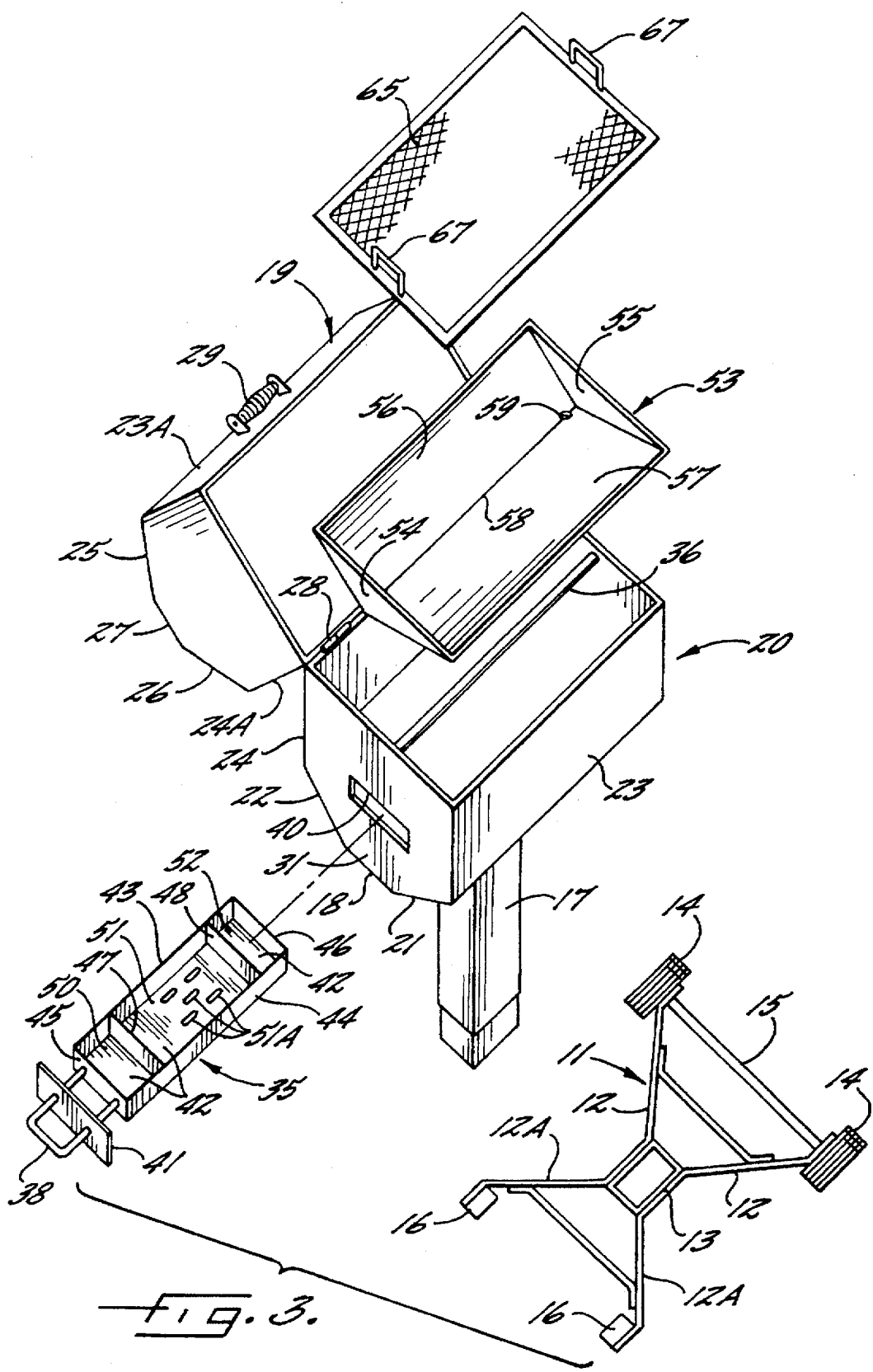

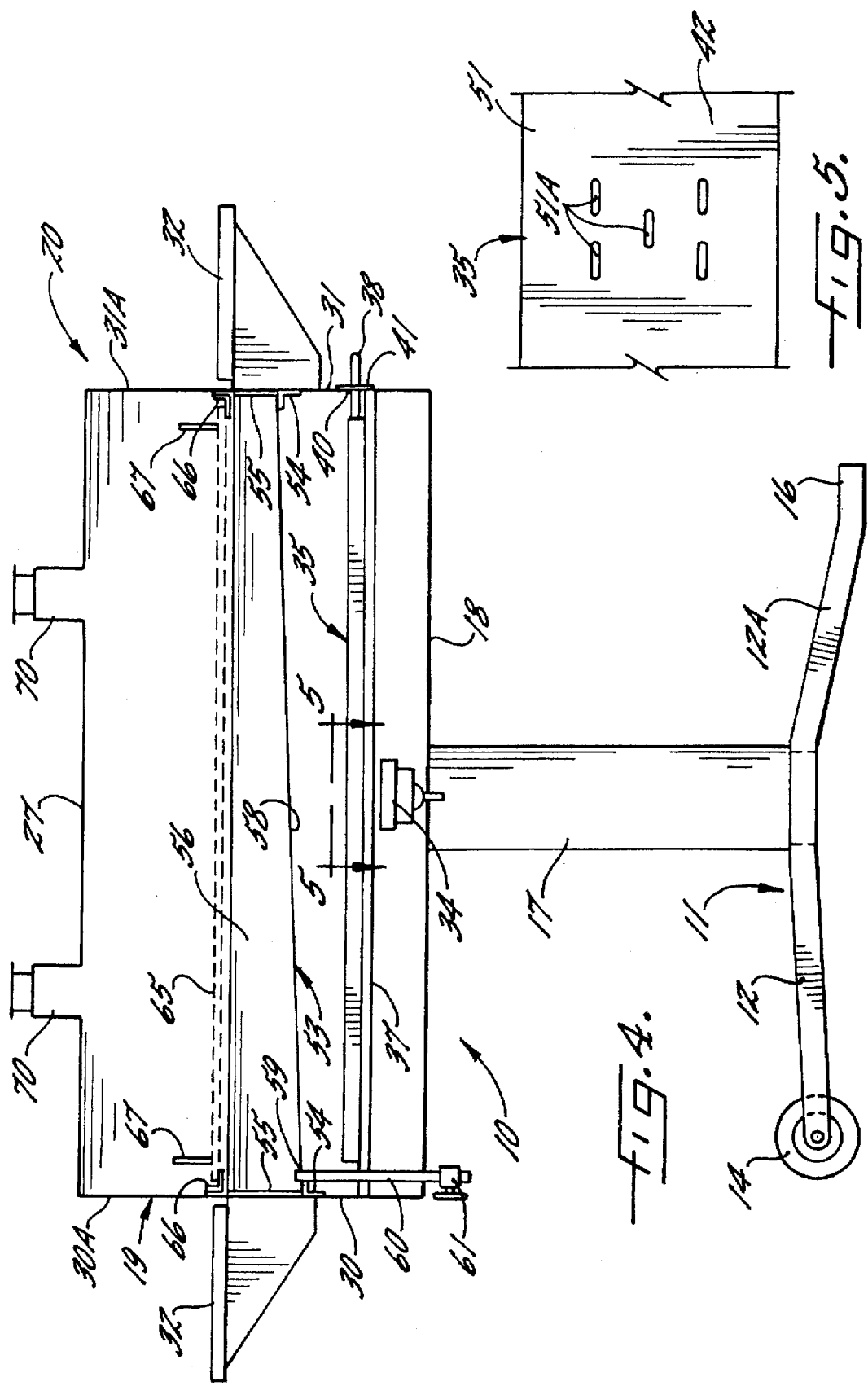

BARBECUE AND COOKING APPARATUS

FIELD OF THE INVENTION

The present invention is a grill intended for use in outdoor cooking. It is a grid enclosed in a housing arranged for even distribution of heat through the grid, and the grill is selectively usable to barbecue meat with or without wood favoring or to steam meat and other food.

BACKGROUND OF THE INVENTION

Outdoor cooking apparatus that can be selectively used as a barbecue grill, a smoker or a steamer is shown in U.S. Pat. No. 4,773,319, issued Sep. 27, 1988 to Robert B. Holland for BARBECUE GRILL AND COOKER. The Holland patent discloses, in ascending order, a heat source, a heat deflector, a grease collector and a food supporting grid enclosed in a housing.

Holland explains that the grease collector prevents the "flaming" of burning grease by collecting the grease instead of letting the grease contact the heat source, and that the grease collector is sufficiently heated to vaporize part of the grease falling on it to provide smoke for imparting a barbecue flavor to food being cooked.

Holland also explains that the grease collector may be filled with water instead of grease when it is desired to cook meat or other food with steam instead of barbecuing it.

Holland further explains that, if desired, commercially available liquid hickory smoke can be added to the water in the grease collector in order to smoke hams, turkeys, fish and the like.

In practice, it has been found that the smoke obtained from Holland's grease collector while barbecuing meat and the smoke obtained by adding commercially available liquid hickory smoke to the water in Holland's grease container is different than the popular hickory flavor obtained from the smoke of natural hickory wood, and in some cases the amount of smoke obtained from Holland's grease collector and from the liquid hickory smoke Holland uses is less than desirable

SUMMARY OF THE INVENTION

The barbecue and cooking apparatus of the present invention combines Holland's advantages of selectively barbecuing, steaming or smoking food with a wood chip tray that noticeably changes and improves the flavor of the food that is barbecued or smoked on the cooking apparatus of this invention.

The wood chip tray is in closely spaced vertical relation to the gas-fired heat source beneath the tray and becomes extremely hot in use. Two compartments in the tray contain wood chips on opposite sides and in laterally spaced relation to the heat source.

The center of the tray has perforations extending through the tray directly over the heat source. Heat rises through the perforations and moves laterally beneath a grease collector spaced above the wood chip tray. The wood chips in the two laterally spaced compartments are heated by both the iron tray and by the hot air currents flowing past the wood chips. A high volume of smoke is produced from the wood chips by the high temperature of the heated tray and by the hot air currents. The same hot air currents convey the flavor of the chips to meat being cooked on a grid above the grease collector.

A portable housing encloses the foregoing apparatus.

BRIEF DESCRIPTION OF THE DRAWINGS

FIG. 3 is an exploded perspective view, illustrating the assembly of the several elements of the grill;

FIG. 4 is a longitudinal sectional view of the grill; and

FIG. 5 is a sectional view taken substantially along the line 5—5 in FIG. 4.

DETAILED DESCRIPTION OF THE INVENTION

Figure 1:
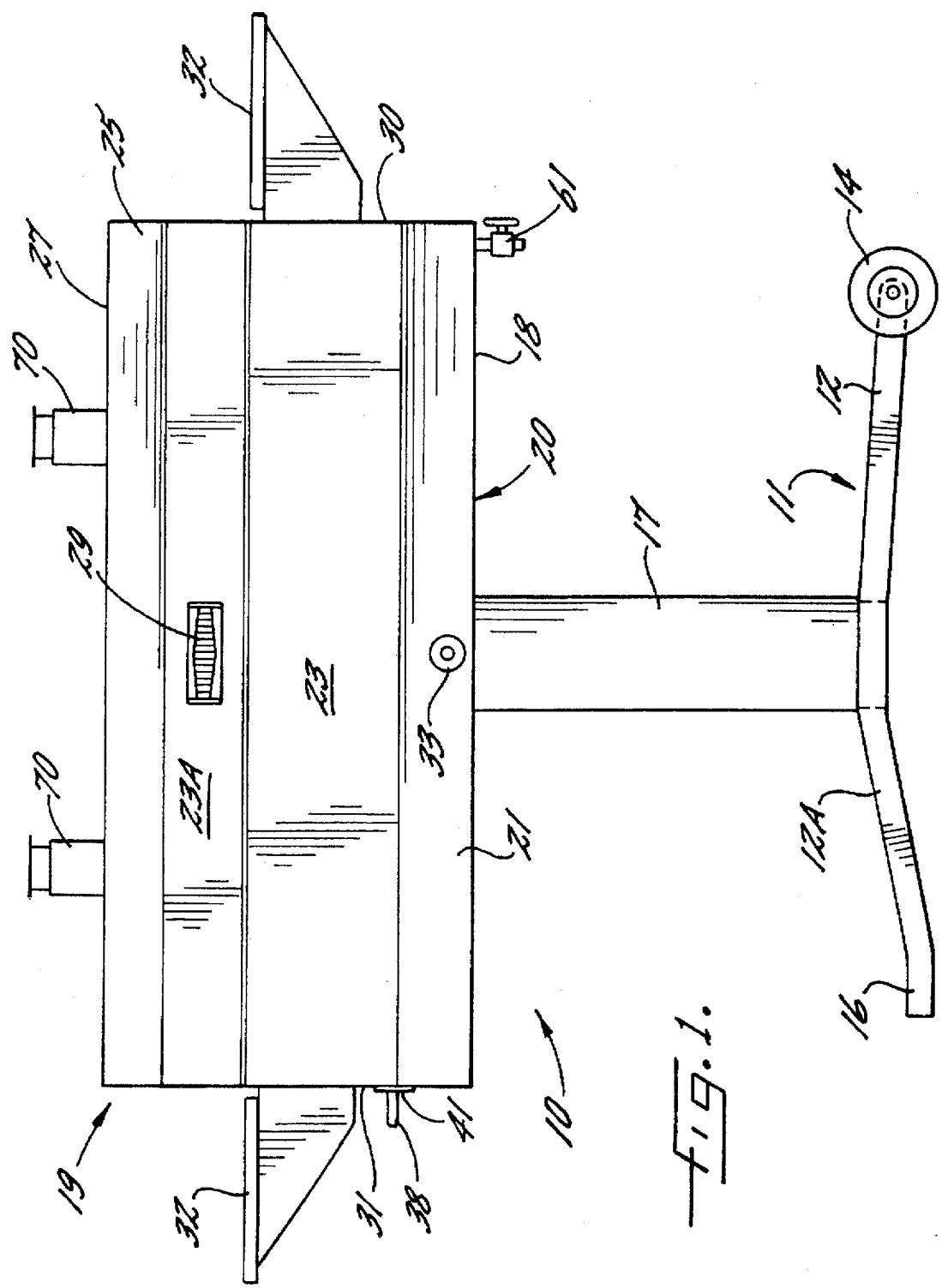
FIG. 1 is a front view of the grill.

Referring more specifically to the drawings, a preferred embodiment of the grill is broadly indicated at 10. The grill 10 comprises a base 11 formed of steel bars 12 diverging forwardly and steel bars 12A diverging rearwardly from a centrally located socket 13. As shown in FIG. 3, the base 11 is supported at the front end on a pair of wheels 14 mounted on an axle 15 extending between the free ends of the steel bars 12. The base 11 is supported at the rear end on a pair of feet 16 at the free ends of steel bars 12A. A pedestal 17 rises from the socket 13 and is fastened at its upper end to the bottom wall 18 of a housing broadly indicated at 20.

Figure 2:
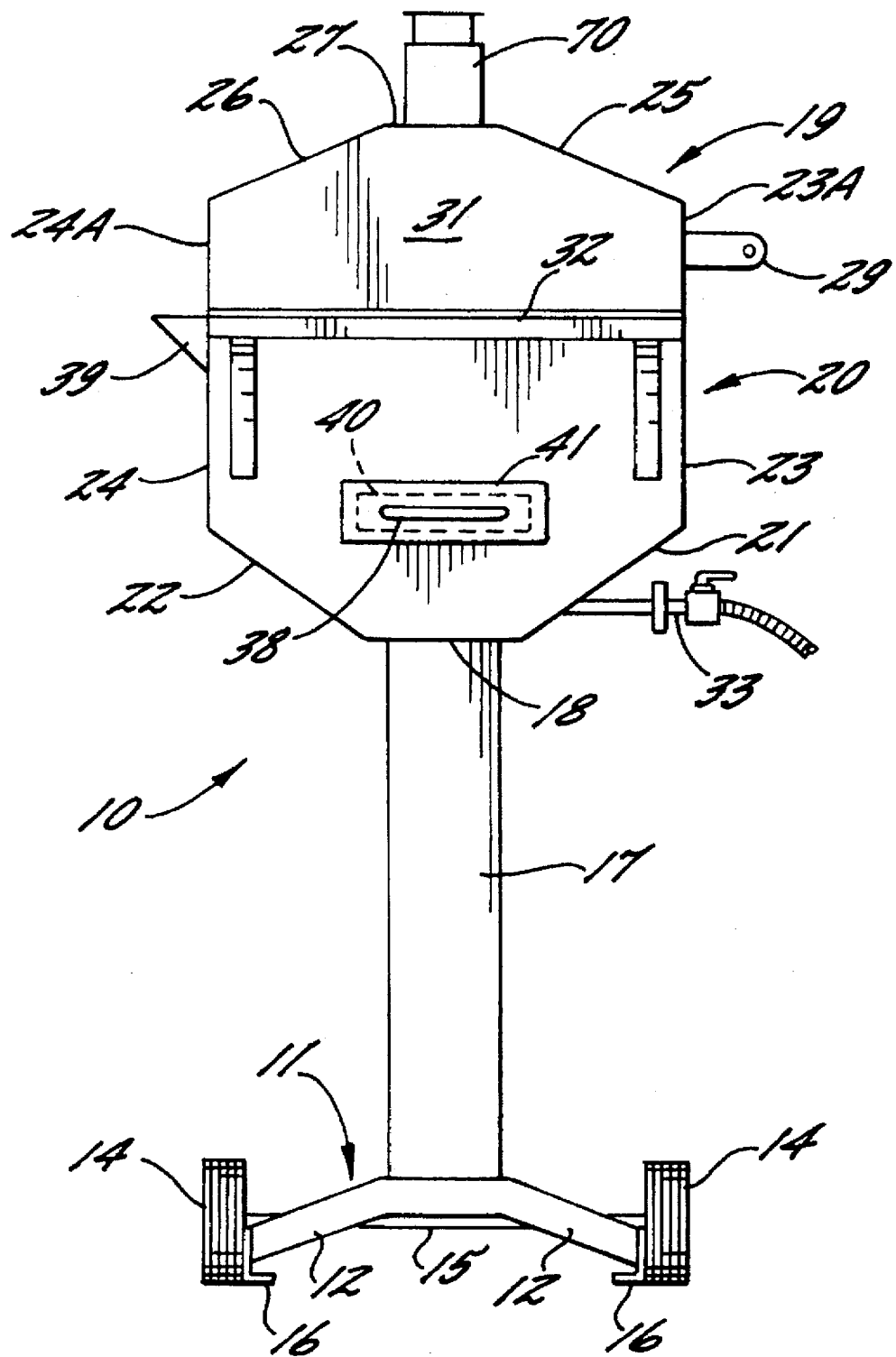
FIG. 2 is an end view of the grill, looking at the right side of FIG. 1.

The housing 20 is preferably formed with heavy gauge cold roll steel in an octagonal configuration when viewed from the end, as in FIG. 2. The housing 20 is formed with lower angular side walls 21 and 22 diverging from the bottom wall 18, vertical side walls 23, 24 rising from the walls 21,22, upper angular side walls 25, 26 converging toward each other from the vertical side walls 23, 24, and a top wall 27 extending in parallel relation to the bottom wall 18 and joining the upper angular side walls 25, 26. Octagonally shaped from and rear walls 30 and 31 close the front and rear of the housing.

The vertical side walls 23, 24 and the front and rear walls 30, 31 include upper portions 23A, 24A and 30A and 31A. The vertical side wall 24 and its upper portion 24A are hinged together as at 28 (FIG. 3) and the upper portions 23A, 30A and 31A form a lid 19. The lid 19 may be lifted by a handle 29 to provide access to the interior of the housing 20. A pair of brackets 39, one of which is shown in FIG. 2, extend outwardly from the upper edge portion of vertical side wall 24 to support the opened lid 19. Shelves 32 extend outwardly from the front and rear walls 30, 31 for use during the preparation and serving of food cooked within the housing.

A gas inlet 33 extends from a burner assembly 34 through the angular side wall 21 for connection to a source of natural or propane gas (not shown). Gas is used as the source of heat for cooking or barbecuing in the preferred embodiment, but other means, such as electricity or charcoal, may be used as the source of heat within the scope of the invention.

The burner assembly 34 is supported by the bottom wall 18 of housing 20 and is centrally located, directly above the pedestal 17. Immediately above and is closely spaced relation to the burner assembly 34 is a wood chip tray 35, most clearly seen in FIG. 3.

The wood chip tray 35 is supported on two elongated rails 36 and 37 extending between the front and rear walls 30, 31, and the tray 35 extends almost the entire distance between the front and rear walls 30, 31, as seen in FIG. 4. A handle 38 extends from one end of the tray 35 for pulling the tray 35 through an opening 40 in the rear wall 31. The opening 40 is closed by an appropriately shaped and sized flange 41 on the handle 38 (FIG. 3) when the tray 35 is fully seated in the housing 20, as in FIG. 4.

The wood chip tray 35 is formed of steel with a bottom wall 42, side walls 43, 44 end walls 45, 46. Two transverse wall 47 and 48, spaced inwardly from end walls 45 and 46, divide the tray 35 into three compartments, 50, 51 and 52. When the wood chip tray 35 is operably positioned for barbecuing or cooking within the housing 20, as in FIG. 4, the central or middle compartment 51 is directly over the burner assembly 34. The bottom wall 42 in compartment 51 has a plurality of perforations of openings 51A extending therethrough for the transfer of heat from the burner assembly 34 to the interior of the housing 20. The compartments 50 and 52 at the ends of the tray 35 are provided for the reception of wood chips, not shown, to provide flavoring for the food being cooked or barbecued.

A removable grease tray 53 is supported on angle irons 54 (FIG. 4) above the wood chip tray 35. The grease tray 53 is formed from cold roll steel with triangularly shaped end walls 55 at the ends of upwardly diverging side walls 56 and 57 that are joined together as at 58 along their lower edges. The grease tray 53 slopes downwardly from its end wall 54 near the rear wall 31 of the housing 20 to its front wall 55 near the front wall 30 of the housing. An opening 59 is formed through the juncture of the walls 56 and 57 of the grease tray 53 near the front wall 30 of the housing 20. A drainage tube 60 is removably connected to the opening 59, and extends down from the opening, through the bottom wall 18, to a valve 61 beneath the housing 20.

A perforated grid 65, preferably formed of expanded metal, is removably supported on angle irons 66 extending inwardly from front and rear walls 30 and 31. An upstanding handle 67 rises from each end of the grid 65.

OPERATION

Meat may be barbecued on the grid 65 with or without the flavor of wood, such as hickory. The flavor of wood, if it is desired, is provided by first grasping the handle 38 on the wood chip tray 35 and sliding it outwardly through the opening 40 in the rear wall 31. Wood chips to provide the desired flavor are then placed in the compartments 50 and 52 at the ends of the tray 35, and the wood chip tray is returned through the opening to its place on the rails 36 and 37 in the housing 20.

The meat is then placed on the grid 65 and the burner 34 is activated to provide the heat desired for barbecuing the meat. The heat rises from the burner 34 through the perforations 51A that extend through the floor 42 of the central compartment 51 in the wood chip tray. The rising heat is deflected along the length of the upwardly angled walls 56 and 57 and across the wood chips in the compartments 50 and 52 at the ends of the tray 35. The heated and flavored air currents continue to rise upwardly against and around the sides and ends of the grease tray 53. The heated grease tray radiates heat substantially uniformly throughout the grid 65 to the meat placed thereon. The heated and flavored air currents heat and flavor the meat and continue to rise above the meat on the grid and leave the housing 20 through smoke vents 70 in the top wall 27.

Meat and other food may be cooked by steaming it in the grill 10. Steaming is accomplished by filling the grease tray 53 with water and closing the valve 61 in the drain from the grease tray. The water is heated to steam temperature as the burner 34 heats the grease tray. Steaming of food may be accomplished with or without the use of wood chips for flavoring.

There is thus provided a grid enclosed in a housing arranged for even distribution of heat through the grid. The removable wood chip tray functions to direct heat along the grease tray and to selectively contain wood chips for flavoring food. The grease tray may be filled with water for steaming food.

I claim:

1. A barbecue and cooking apparatus having a housing defined by a bottom wall, a top wall, side walls, a front wall and a rear wall, a burner assembly on the midportion of the bottom wall and a perforated grid above the burner assembly, wherein the improvement comprises a wood chip tray for use within the housing, the wood chip tray extending almost the entire distance between the front and rear walls of the housing when the wood chip tray is operably installed in the housing, the wood chip tray comprising two imperforate compartments for containing wood chips during use of the apparatus, the two compartments for containing wood chips are at opposite ends of the wood chip tray, a first of said compartments being spaced closely inwardly from the front wall and the second of said compartments being spaced closely inwardly from the rear wall, whereby the two compartments for containing wood chips are spaced longitudinally from the burner assembly on the midportion of the bottom wall.

2. The invention of claim 1 wherein one wall of the housing has an opening through it to accommodate the wood chip tray, whereby the wood chip tray can be installed in and removed from the housing.

3. The invention of claim 1 wherein the wood chip tray is formed from steel and includes a third compartment extending between the first and second compartments on a common bottom wall, and the medial portion of the third compartment being positioned directly over the burner assembly when the wood chip tray is operably installed in the housing.

4. The invention of claim 2 wherein the wood chip tray is formed from steel and includes a third compartment extending between the first and second compartments on a common bottom wall with the medial portion of the third compartment positioned directly over the burner assembly when the wood chip tray is operably installed in the housing.

5. The invention of claim 3 wherein the medial portion of the third compartment is perforated with openings extending through the bottom wall.

6. The invention of claim 5 wherein the barbecue and cooking apparatus includes a grease tray between the perforated grid and the wood chip tray.

7. The invention of claim 7 wherein the barbecue and cooking apparatus includes a grease tray between the perforated grid and the wood chip tray.

* * * * *